United States Patent [19]

Shimizu et al.

[11] 4,301,511
[45] Nov. 17, 1981

[54] PROGRAMMABLE CALCULATOR WITH A DEVICE FOR CONTROLLING THE READING OF PROGRAM DATA

[75] Inventors: Tomohiro Shimizu, Fussa; Yoshinobu Muranaga, Kurume, both of Japan

[73] Assignee: Casio Computer Co., Ltd., Tokyo, Japan

[21] Appl. No.: 100,054

[22] Filed: Dec. 4, 1979

[30] Foreign Application Priority Data

Dec. 8, 1978 [JP] Japan .................. 53-151849

[51] Int. Cl.$^3$ .................. G06F 15/02; G06F 3/14
[52] U.S. Cl. .................. 364/709; 364/706; 364/710
[58] Field of Search .................. 364/706, 709, 710

[56] References Cited

U.S. PATENT DOCUMENTS

| | | | |
|---|---|---|---|
| 4,007,443 | 2/1977 | Bromberg et al. | 364/709 |
| 4,009,379 | 2/1977 | Musch | 364/706 |
| 4,152,771 | 5/1979 | Olander, Jr. et al. | 364/710 |
| 4,177,520 | 12/1979 | Meff | 364/710 X |

*Primary Examiner*—Jerry Smith
*Attorney, Agent, or Firm*—Frishauf, Holtz, Goodman & Woodward

[57] ABSTRACT

A programmable calculator with a device for controlling the reading of program data comprises an input section including at least one key for designating program data, a memory section for storing the program data, a program data reading section for reading the program data from the memory section, and a display section for displaying the program data. The apparatus further comprises a detecting section for detecting that the key has been depressed for a time longer than a predetermined one. When the detecting section produces an output signal, the program data reading section is so controlled as to continuously read the program data from the memory section.

9 Claims, 9 Drawing Figures

PROGRAM LIST

| NUMBER OF STEPS OF PROGRAM COUNTER | |
|---|---|
| 1 | P 1 |
| 2 | Min 1 |
| 3 | Min 2 |
| 4 | MR 1 |
| 5 | × |
| 6 | MR 2 |
| 7 | = |
| 8 | Min 3 |
| 9 | MR 3 |
| 10 | P 2 |
| 11 | |

| | 1 | 2 | 3 | 4 | 5 |
|---|---|---|---|---|---|
| 1 | P1 | P2 | P3 | P4 | P5 |
| 2 | Min1 | Min2 | Min3 | Min4 | Min5 |
| | [1-1 | [1-2 | [1-3 | [1-4 | [1-5 |
| 3 | MR1 | MR2 | MR3 | MR4 | MR5 |
| | [2-1 | [2-2 | [2-3 | [2-4 | [2-5 |
| 4 | + | − | × | ÷ | = |
| | F1-1 | F1-2 | F1-3 | F1-4 | F1-5 |

(a) P1
(b) P1 [1-1
(c) P1 [1-2
(d) P1 [2-1
(e) P1 F1-3
(f) P1 [2-2

PROGRAMMABLE CALCULATOR WITH A DEVICE FOR CONTROLLING THE READING OF PROGRAM DATA

BACKGROUND OF THE INVENTION

This invention relates to a programmable calculator with a device for controlling the reading of program data, in which a program memory is so used as to effectively check the program data stored in the program memory.

Long and commonly used is the so-called "programmable calculator" which has a program memory device. An operator pushes keys of the calculator to store program data into the program memory device, whereby various arithmetic operations can be controlled and carried out according to the program data. The keyboard of the calculator of this type includes a key which is operated in order to check the program data stored in the program memory device. As the key is repeatedly depressed, the program data are read out from the memory device, the first program step, the second program step, and the third program step and so forth. Then, the steps of program are displayed by a display device one after another, one step at a time. Seeing the steps of program displayed on the display device, the operator can recognize that the right or wrong program steps have been stored into the memory device, can correct a wrong program step, or can replace a wrong program step with the correct one.

In the above method, however, the operator must push the key many times until a desired program step is displayed if many program steps have been stored into the program memory device. The known method is disadvantageous in that much time is usually required for displaying and checking a desired program step.

An object of this invention is to provide a programmable calculator with a device for controlling the reading of program data, which can read program data in various manners according to the time during which a specified key is kept depressed and which can therefore effectively check the program data.

SUMMARY OF THE INVENTION

According to this invention there is provided a programmable calculator with a device for controlling the reading of program data, which comprises input means having ten keys for entering numerical data, function keys for entering function data and at least one specified key for reading out program data; memory means for storing program data which are entered by selectively operating the keys of the input section; program data reading means for reading the program data from the memory section according to the operation of the specified key; display means for displaying the program data read out by the program data reading means from the memory means; detection means for detecting that the specified key has been depressed for a time longer than a predetermined one; and control means for controlling the program data reading means when the detecting means detects that the specified key has been depressed for a time longer than the predetermined time, thereby causing the program data reading means to continuously read the program data from the memory means.

If the specified key is depressed for a time equal to, or shorter than, the predetermined time, the program data reading means reads one program data from the memory means. If the specified key is kept depressed for a time longer than the predetermined one, two or more program data are continuously read out from the memory means until the operator stops pushing the key. Thus, a desired program data may be read out from the memory means and displayed by the display means quickly in the following way. First, the operator keeps on pushing the specified key so that the program data are read out and displayed continuously one after another. Second, when the data representing the program steps near the desired data or the desired program step, are read out and displayed, the operator stops depressing the specified key. Third, he repeatedly pushes the specified key until the desired data is read out from the memory means and displayed by the display means. This key operation is relatively easy and can be made quickly.

BRIEF DESCRIPTION OF THE DRAWINGS

FIGS. 7(a) to 7(f) show in what fashion program data are displayed by a display section of the embodiment shown in FIG. 1.

DETAILED DESCRIPTION

Figure 1:
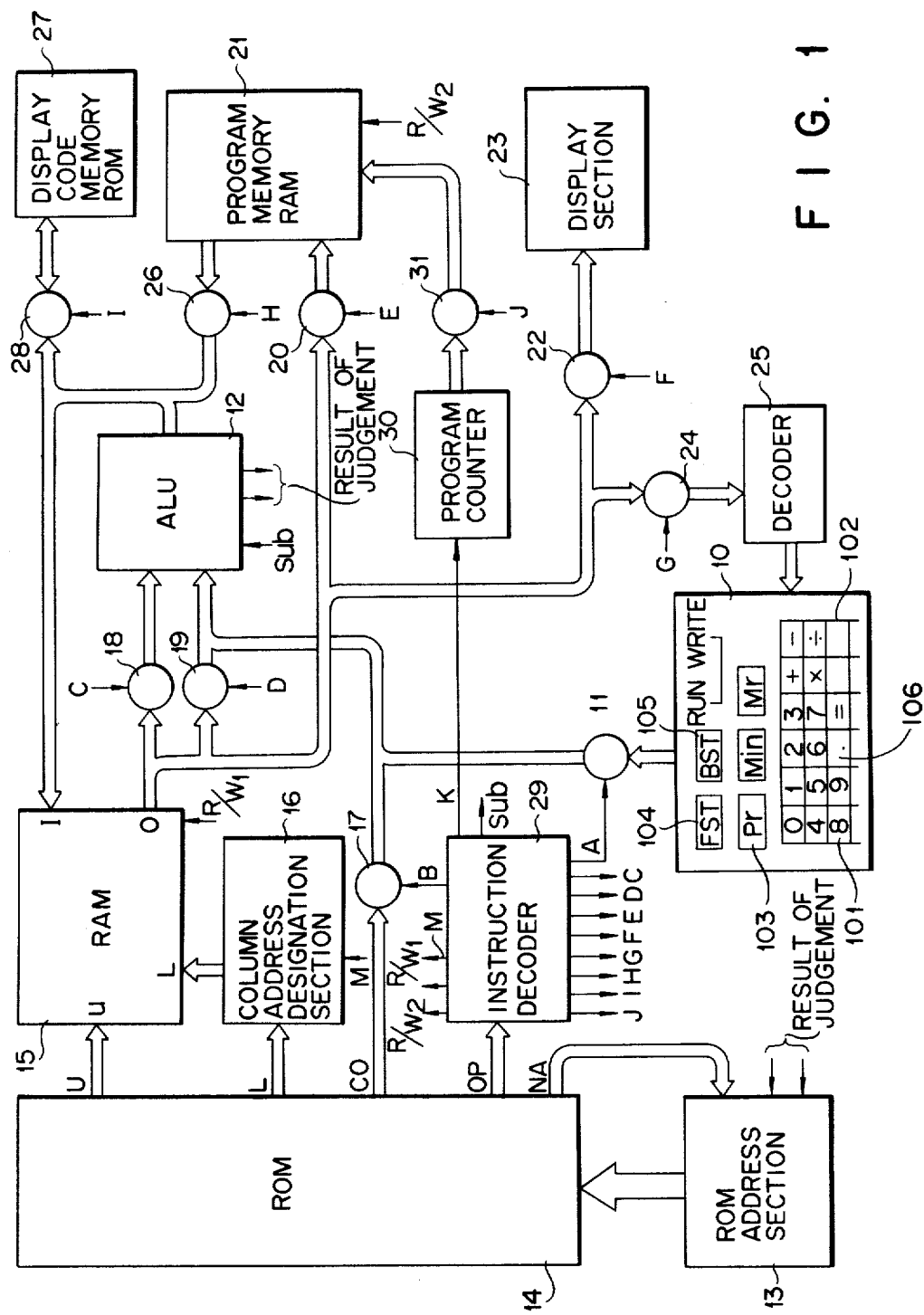
FIG. 1 is a block circuit diagram of one embodiment of this invention.

Now referring to FIG. 1, a programmable calculator according to this invention will be described. The calculator comprises a key input section 10 which has various keys. More specifically, the key input section 10 has ten keys 101 for entering numerical data and function keys 102 for instructing various arithmetic operations. The section 10 further has a program number desginating key 103 for entering a serial number of each program in order to distinguish the program from another. The section 10 further includes an FST key 104 for reading and displaying program data (or program steps), one by one and a BST key 105 for reading and displaying the program data, one by one in the reverse order. Moreover, the section 10 is provided with a decimal point key 106 and mode switches for designating the modes of storing and executing programs.

Various input data entered at the key input section 10 are supplied through a gate 11 to an arithmetic logic unit (ALU) 12. The ALU 12 carries out various arithmetic operations, compares data to see which data is larger or smaller than others and detects presence or absence of data. The output data of the ALU 12 are supplied to a ROM address section 13. The ROM address section 13 and a ROM (read only memory) 14, which will later be described, constitute a microprogram control section.

When the ROM address section 13 designates one of the addresses of the ROM 14, a microinstruction is delivered from the designated address of the ROM 14. More precisely, the ROM 14 supplies the ROM address section 13 with a next address designating signal NA, supplies a RAM (random access memory) 15 with a row address designating signal U, and supplies a column designating signal L to the RAM 15 through a column address designation section 16. The signal U designates one of the registers which constitute the RAM 15, and the signal L usually designates a specific one of the digits which constitutes the register designated by the signal U. Two or more digits of the register designated by the signal U may be designated. To designate the first to fifth digit, for example, the column address of the least significant digit (i.e. the first digit) and the column address of the most significant digit (i.e. the fifth digit) are supplied to the column address designation section 16. Then, the least significant digit, for instance, is designated, and its column address is made to step forward until it coincides with the column address of the most significant digit, whereby the five digits (i.e. the first digit to the fifth digit) are designated one after another. The column address of a digit is made to step forward or backward by an up-down counter provided in the section 16, and it is detected to coincide with the column address of another digit by means of a comparator circuit provided in the section 16. Whether one digit or more are to be designated is determined according to a control signal M which is supplied the column address designation section 16 from an instruction decoder 29, which will later be described in detail.

Figures 2, 3:
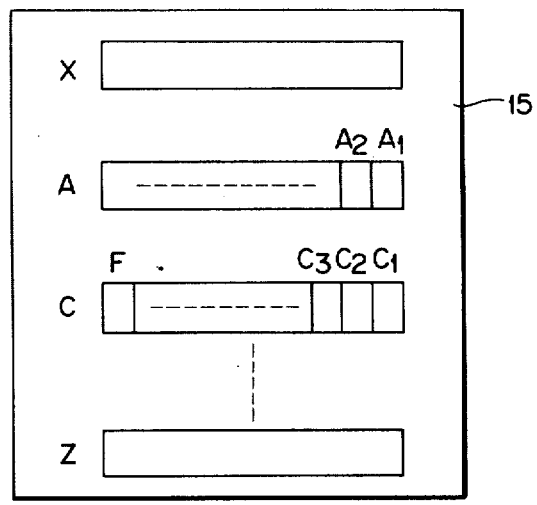
FIG. 2 shows how the registers of a random access memory (RAM) used in the embodiment of FIG. 1 are arranged.
FIG. 3 shows a part of a program which may be stored in a program memory RAM used in the embodiment of FIG. 1.

The ROM 14 supplies a code signal CO to the ALU 12 via a gate 17. As illustrated in FIG. 2, the RAM 15 comprises an X register, an A register, a C register, an operation register (not shown), a register (not shown) with a key sampling count digit, some other similar registers (not shown) and a Z register. The X register is to store data to be displayed. The A and C registers are to store control data. More precisely, the first and second digits of the A register store a program data, which will later be described. The register C stores at the first digit a time counting data for avoiding the so-called "chattering" which occurs when any key of the key input section 10 is pushed once, not repeatedly. Further the register C stores at the second and third digits a count data which indicates whether the FST key 104 is repeatedly or continuously depressed. Still further the register C stores at F digit a flag when the FST key 104 is continuously depressed.

First operands and second operands are entered into the operation register of the RAM 15. If necessary, the first operands are supplied to the ALU 12 through a gate 18, and the operands are supplied to the ALU 12 through a gate 19. Using these operators and operands the ALU 12 carries out various arithmetic operations. The results of the operations thus performed are written into the operation register of the RAM 15.

The program data stored at the first and second digits of the A register is written into a program memory RAM 21 via a gate 20. The data stored in the X register are supplied via a gate 22 to a display section 23 and are subsequently displayed by the display section 23. A data stored at the key sampling digit of the RAM 15 is supplied via a gate 24 to a decoder 25, thereby to detect whether or not any key of the key input section 10 is depressed. The data decoded by the decoder 25 is then applied to the key input section 10.

The program memory RAM 21 stores a program prepared by a programmer, a part of which is illustrated in FIG. 3. The program data stored in the RAM 21 are supplied via a gate 26 to the A register of the RAM 15.

The first and second digits of the RAM 15 temporarily stores the program data, one at a time. At the same time, one program data is supplied to the ALU 12 also through the gate 26. Though not described in detail here, the ALU 12 carries out an arithmetic operation based on the program data, under control of a microinstruction supplied from the ROM 14.

Figures 4, 7:
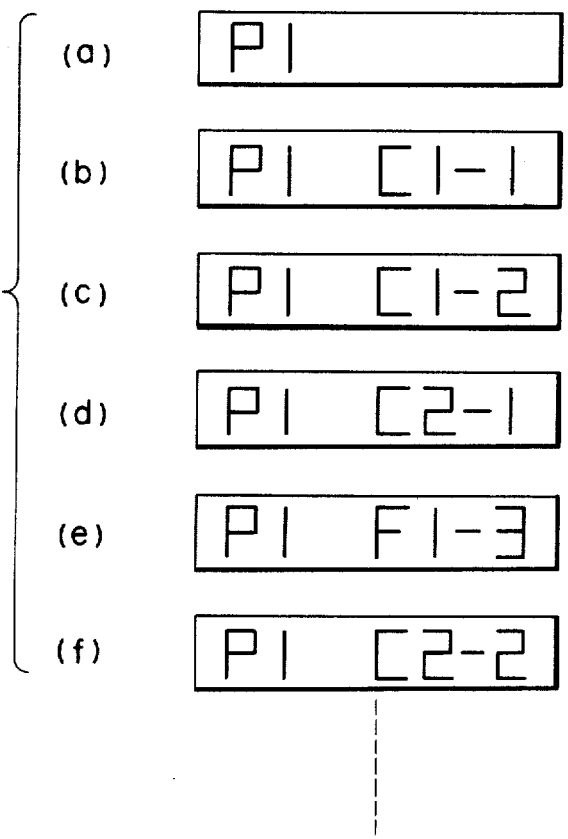
FIG. 4 is a table showing the relationship between a display format and instructions contained in a program.

Each of the program data shown in FIG. 3 is represented by a two-digit code as illustrated in the table of FIG. 4. One digit of the code indicates the row of the table, in which a program data is listed, and the other digit indicates the column of the table, in which the program data is listed. For example, program data "P1" is represented by code (1, 1), and program data "X" is represented by code (4, 3).

To check the program stored in the program memory RAM 21, the program data written at the first and second digits of the A register is supplied to a display code memory ROM 27 through a gate 28 converted into a display code. The display code thus obtained is written into the X register of the RAM through the gate 28. The ROM 27 converts each program data stored in the RAM 21 into a display code which will display the program data in such format as shown in the table of FIG. 4. For example, program data "Min 1" is converted into a display code which corresponds to "[1-1", and program data "X" into a display code which corresponds to "F1-3".

The ROM 14 supplies an operation signal OP to the instruction decoder 29. Upon receipt of the signal OP the instruction decoder 29 produces gate control signals A, B, C, D, E, F, G, H, I and J, which open the gates 11, 17, 18, 19, 20, 22, 24, 26, 28 and 31. At the same time, the decoder 29 supplies a subtraction instruction Sub to the ALU 12, a control signal K to a program counter (PC) 30 for achieving an increment or decrement of the count of the counter 30, a read-write signal $R/W_1$ to the RAM 15, a read-write signal $R/W_2$ to the program data RAM 21, and a control signal M to the column address designation section 16 for controlling the section 16 when data are read out from, or written into, two or more digits of the RAM 15. The program counter 30 supplies the RAM 12 with a program address designating signal, whereby one of the addresses of the RAM 21 is designated.

Now referring to FIGS. 5, 6 and 7, it will be described how to check the program data in the programmable calculator shown in FIG. 1.

Figure 6A:
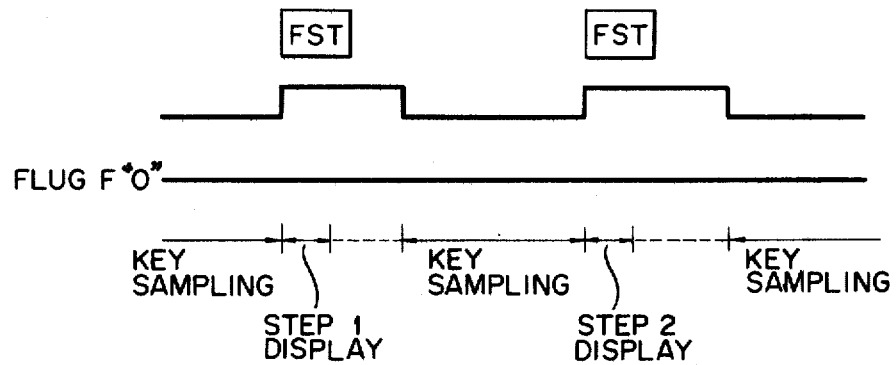
FIGS. 6(a) and 6(b) show the relationship between an FST key operation and program data displayed.

First, it will be described how the program data are displayed and checked by repeatedly pushing the FST key 104 as illustrated in FIG. 6(a).

Figure 5:
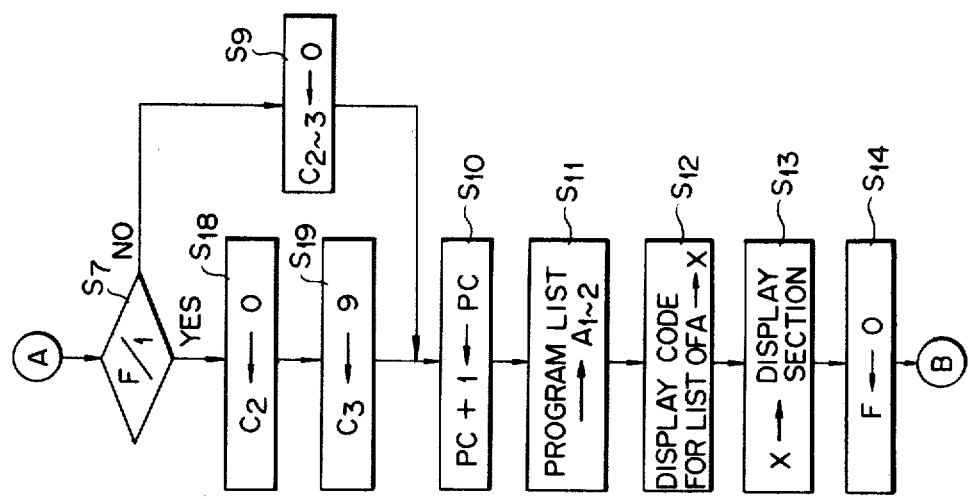
FIG. 5 is a flow chart illustrating how the embodiment of FIG. 1 operates.
Figure 5:
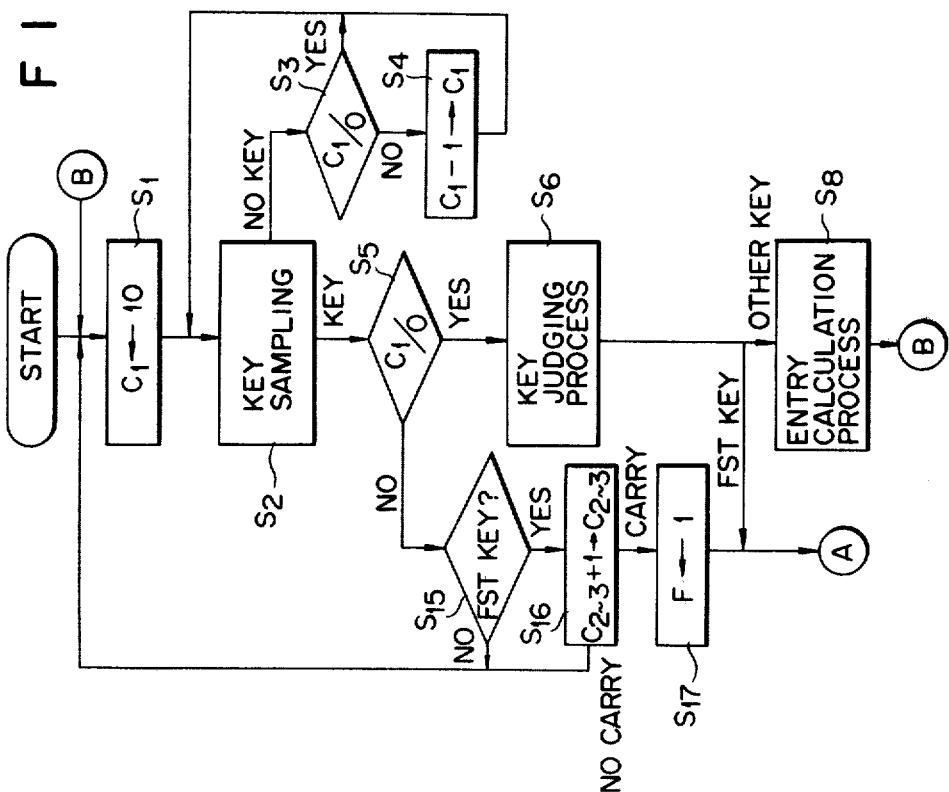

As shown in FIG. 5, at step $S_1$ a code signal CO which has a decimal value [10] on binary coded signal (1010) is supplied from the ROM 14 to the first digit of the C register via the gate 17 and the ALU 12. To achieve this, a row designating signal U and a column designating signal L have been supplied from the ROM 14 to the RAM 15, thereby designating the first digit of the C register. After the coded signal (1010) has been written into the first digit of the C register, next step $S_2$, i.e. key sampling is conducted. More specifically, the count stored in the key sampling count digit of the RAM 15 is supplied to the key input section 10 through the decoder 25, thereby detecting whether or not the key input section 10 is producing an output data and thus detecting whether any key is depressed. If none of the keys are depressed, [+1] is added to the count stored in the key sampling count digit of RAM 15, and a third step $S_3$ is started.

In third step $S_3$, the data stored in the first digit of the C register is supplied to the ALU 12, and the ALU 12 detects whether the data has a decimal value [0]. The ALU 12 supplies the ROM address section 13 with a signal showing that the data has not a decimal value [0]. At the same time, a next address signal NA is supplied to the ROM address section 13 from the ROM 14.

Fourth step $S_4$ is then started to take [1] from the data stored in the first digit of the C register. More precisely, the data stored in the first digit of the C register is supplied to the ALU 12, and a code signal CO which has a decimal value [1] is supplied from the ROM 14 to the ALU 12. According to a subtraction instruction Sub delivered from the instruction decoder 29, the ALU 12 carries out subtraction: "$C_1 - 1$". Decimal value [1] is therefore taken from the decimal value [10] stored in the first digit of the C register, which is therefore reduced to [9].

Upon completion of this subtraction, the second step $S_2$ is started again. Key sampling is achieved in the same way as mentioned above, using the new count stored in the key sampling count digit of the RAM 15. The second step $S_2$ is followed by the third step $S_3$ and the fourth step $S_4$, which are carried out in the same way as mentioned above. Until the data stored in the first digit of the C register is reduced to [0] in the fourth step $S_4$, the steps $S_2$, $S_3$ and $S_4$ are repeated. After the data has been reduced to [0], only the second step $S_2$ and the third step $S_3$ are repeated until the FST key 104 is pushed as shown in FIG. 6(a). Right after the FST key 104 has been depressed, in the step $S_2$ it is detected that any key of the key input section has been pushed. Then, a fifth step $S_5$ is started.

In the fifth step $S_5$, it is detected, as in the third step $S_3$, whether the data stored in the first digit of the C register has a decimal value [0]. Since the data has a decimal value [0], a sixth step $S_6$ is started. In the sixth step $S_6$ it is detected which key has been pushed at the key input section 10. If the FST key 104 is detected to have been pushed, a seventh step $S_7$ is started. If any other key is detected to have been pushed, an eighth step $S_8$ is started. In the eighth step $S_8$, data entered or arithmetic operations are carried out, and the eighth step $S_8$ is followed by the first step $S_1$ and the second step $S_2$.

Since the FST key 104 has been pushed, the seventh step $S_7$ is started. In the seventh step $S_7$, it is detected whether a flag representing that the FST key 104 has been continuously depressed is written in the F digit of the C register. That is, the data stored in the F digit designated by the signals U and L delivered from the ROM 14 and the code signal CO delivered from the ROM 14 are supplied into the ALU 12, and the former is subtracted from the latter, thus detecting whether the difference between them is [0]. Since no flag written in the F digit of the C register, a ninth step $S_9$ is started.

In the ninth step $S_9$, [0] is written into the second and third digits of the C register so as to detect if the FST key 104 is depressed continuously or repeatedly. The step $S_9$ is followed by a tenth step $S_{10}$, in which the count of the program counter 30 is increased according to a control signal K delivered from the instruction decoder 29. If the count of the counter 30 is [0], it is increased to [1]. This done, an eleventh step $S_{11}$ is started. In the step $S_{11}$ the count of the program counter 30 is applied to the program memory RAM 21 through the gate 31, thereby designating one of the addresses of the RAM 21. The program data stored in the address thus designated is therefore read out from the RAM 21. Since the count of the counter 30 is [1], the first address 1 of the RAM 21 is designated, and the program data "P1" which is stored in the address 1 and which denotes the first program step 1 is read out from the RAM 21 and written into the first and second digits of the A register of the RAM 15 through the gate 26. In the next step, i.e. a twelfth step $S_{12}$, the data written in the first and second digits of the A register is supplied to the display code memory ROM 27 via the gate 28 and converted into a display code, which is written into the X register of the RAM 15. Then, a thirteenth step $S_{13}$ is started. In the step $S_{13}$ the display code is supplied from the X register to the display section 23 via the gate 22, whereby the program data (or program step) "P1" is displayed in such a fashion as illustrated in FIG. 7(a). After this data display a fourteenth step $S_{14}$ is started, thereby writing [0] into the F digit of the C register, and the first step $S_1$ is started again. Until any key of the key input section 10 is pushed, the steps $S_2$ and $S_3$ or the steps $S_2$, $S_3$ and $S_4$ are repeated.

When the FST key 104 is further pushed as shown in FIG. 6(a), the steps $S_2$, $S_5$, $S_6$, $S_7$, $S_9$ and $S_{10}$ are repeated. In the tenth step $S_{10}$ the count of the program counter 30 is increased to [2]. As a result, the second address 2 of the program memory RAM 21 is designated, and the program data "Min 1" which denotes the second program step 2 is read out from the RAM 21. Consequently, the data "Min 1" is displayed by the display section 23 together with the program data "P1" in such a fashion as shown in FIG. 7(b).

The other program data "Min 2", "MR 1", "X", "MR 2" and so forth, which are written in the RAM 21 as shown in FIG. 3, are displayed as shown in FIGS. 7(c) to 7(f) by the display section 23 as the FST key 104 is repeatedly depressed.

Figure 6B:
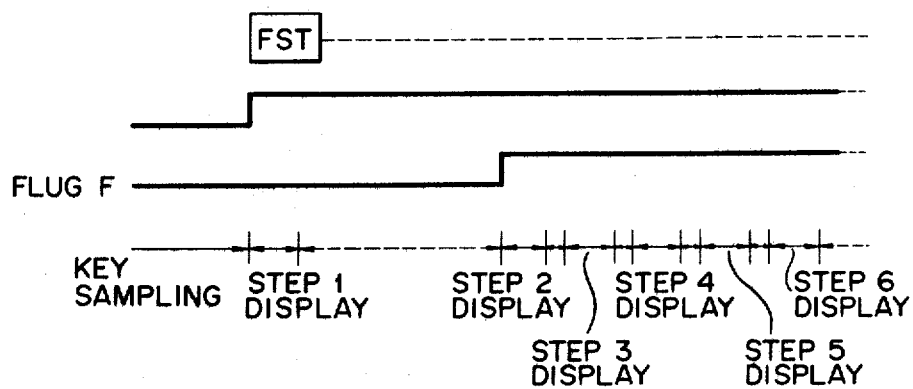

Now it will be described how the program data are displayed and checked by continuously pushing the FST key 104 as illustrated in FIG. 6(b).

Suppose the count of the program counter 30 is [0] when the FST key 104 is pushed. For some time after the FST key 104 has been pushed, the steps $S_5$, $S_6$, $S_7$ and $S_9$ and $S_{10}$ are carried out in the same way as in the case where the FST key 104 is depressed repeatedly. In the tenth step $S_{10}$, the count of the program counter 30 is increased to [1]. Then, the steps $S_{11}$, $S_{12}$, $S_{13}$ and $S_{14}$ are carried out, thus displaying the program "P1" (or the first program step 1). The first step $S_1$ is then started, and a decimal value [10] or binary coded signal (1010) is written into the first digit of the C register. Since the FST key 104 is kept pushed, in the second step $S_2$ it is detected that any key of the key input section 10 is depressed. As a result, the fifth step $S_5$ is started. Since the data stored in the first digit of the C register has a decimal value [10], it is detected in the fifth step $S_5$ that the data does not have a decimal value 0, i.e. "$C_1 \neq 0$". A fifteenth step $S_{15}$ is carried out, thereby detecting if the FST key 104 is depressed, according to the data stored in the key sampling count digit of the RAM 15 and a key output data representing any key depressed. If it is detected that any key other than the FST key 104 is depressed, the first step $S_1$ will be carried out again. Since the FST key 104 is still depressed, the next step, i.e. a sixteenth step $S_{16}$ is started.

In the sixteenth step $S_{16}$, [1] is added to the data stored in the second and third digits of the C register.

More precisely, the data stored in the second and third digits of the C register, which have been designated by signals U and L delivered from the ROM 14, is supplied to the ALU 12, and a code signal CO having a decimal value [1] is supplied from the ROM 14 also to the ALU 12. The data and the code signal CO are added. If a carry is produced by the ALU 12, a seventeenth step $S_{17}$ will be carried out. Suppose the data stored in the second and third digits of the C register has a decimal value [0]. Then, the sum of the data and the code signal CO is [1], and no carry is produced. As a result, the steps $S_1$, $S_2$, $S_5$, $S_{15}$ and $S_{16}$ are carried out over again in this order until the data stored in the second and third digits of the C register is increased to [99], the ALU produces a carry when [1] is added to [99]. The seventeenth step $S_{17}$ is therefore started. In other words, the step $S_{17}$ is not carried out unless the FST key 104 is pushed continuously or kept depressed for a period longer than the time during which the data stored in the second and third digits of the C register is increased from [0] to [100] in the sixteenth step $S_{16}$.

In the seventeenth step $S_{17}$, a flag is written into the F digit of the C register. This done, the seventh step $S_7$ is carried out, thus detecting whether a flag is written in the F digit of the C register. Since a flag is written in the F digit, a eighteenth step $S_{18}$ is started. In the step $S_{18}$ a decimal value [0] is written into the second digit of the C register. Then, a nineteenth step $S_{19}$ is carried out, thereby writing a decimal value [9] into the third digit of the C register. As a result, a decimal value [90] has been written into the second and third digits of the C register. Then, the steps $S_{10}$, $S_{11}$, $S_{12}$, $S_{13}$ and $S_{14}$ are carried out, thereby displaying the program data "Min 1" (or second program step 2).

Since the FST key 104 is still depressed as illustrated in FIG. 6(b), the steps $S_1$, $S_2$, $S_5$, $S_{15}$ and $S_{16}$ are carried out again in this order. The second and third digits of the C register store a decimal value [90], and the ALU 12 therefore produces a carry in a period ten times shorter than the period upon lapse of which the previous carry was produced. Once this carry has been produced, the steps $S_{17}$, $S_7$, $S_{18}$, $S_{19}$ and steps $S_{10}$ to $S_{14}$ are carried out again. As a result, the program "Min 2" (or third program step 3). Thereafter the other program data stored in the program memory RAM 21 are displayed one after another as illustrated in FIG. 6(b) as long as the FST key 14 is continuously depressed.

As described above, the program data are displayed and checked in the same order they have been stored into the program memory RAM 21, as the FST key 104 is repeatedly or continuously depressed. It is possible to display and check them in the reverse order, merely by pushing the BST key 105 continuously or repeatedly, instead of the FST key 104. More specifically, if the FST key 104 is depressed continuously or repeatedly, the count of the program counter 30 is decreased.

This invention is not limited to the above-described embodiment, various changes and modifications are possible within the scope of the invention.

What we claim is:

1. A programmable calculator with a device for controlling the reading of program data, comprising:
    input means having ten keys for entering numeral data, a plurality of function keys for entering function data, at least one specified key for reading out program data and a manually operable switch for designating at least a program data writing mode;
    a data memory coupled to said input means for storing at least numeral data and function data;
    an arithmetic unit coupled to said data memory for executing an operation on data and for returning the data to said data memory;
    a program data memory means for storing program data which are entered by selectively operating at least one of said ten keys and function keys when said program data writing mode is designated by the operation of said manually operable switch;
    program data reading means coupled to said program data memory means for reading the program data from said program data memory means as a function of the operation of said specified key;
    display means coupled to said program data memory means and to said data memory for displaying the selected program data in the program data memory means or the selected data in the data memory;
    detection means associated with said data memory and with said arithmetic unit for detecting that said specified key is kept operated for a period of time longer than a predetermined period of time; and
    control means coupled to said detection means and to said program data reading means for controlling said program data reading means when said detection means detects that said specified key has been kept operated for a said period of time longer than said predetermined period of time, to cause said program data reading means to continuously read said program data from said program data memory means.

2. A programmable calculator according to claim 1, wherein said input means has two specified keys, and said control means includes means for controlling said program data reading means for reading out the program data from said program data memory means in a forward direction when one of said specified keys is operated.

3. A programmable calculator according to claim 1, wherein said input means has two specified keys, and said control means includes means for controling said program data reading means for reading out the program data from said program data memory means in a backward direction when one of said specified keys is operated.

4. A programmable calculator according to claim 2 or 3, wherein said detection means includes an arithmetic operation circuit and a memory circuit coupled to said arithmetic operation circuit, said memory circuit having a register for measuring the time during which said specified keys are operated, and said register receiving the output signals of said arithmetic operation circuit as long as said specified keys are operated.

5. A programmable calculator according to claim 5, wherein said arithmetic operation circuit generates signals "+1" at regular intervals as long as at least one of said specified keys are kept operated, and wherein said register counts said "+1" signals, said register generating a carry signal when its contents reach a predetermined value, thereby detecting that at least one of said specified keys has been kept operated for a time longer than said predetermined period of time.

6. A programmable calculator according to claim 4, wherein said specified keys are manually depressible for operation thereof.

7. A programmable calculator according to claim 2 or 3, wherein said program data memory means comprises a RAM (random access memory), and said program data reading means includes a program counter which selectively undergoes a count increment or a count decrement as long as at least one of said specified keys is kept operated to thereby designate the addresses of said RAM and to read out the program data from the addresses designated.

8. A programmable calculator according to claim 2 or 3, wherein said specified keys are manually depressible for operation thereof.

9. A programmable calculator according to claim 1, wherein said at least one specified key is manually depressible, and said detection means detects when said at least one specified key is kept depressed for a time longer than said predetermined period of time.

* * * * *